US005198052A

United States Patent [19]

Ali

[11] Patent Number: 5,198,052

[45] Date of Patent: Mar. 30, 1993

[54] METHOD OF RESHAPING A GYPSUM BOARD CORE AND PRODUCTS MADE BY SAME

[75] Inventor: Mohammad H. Ali, Ypsilanti, Mich.

[73] Assignee: Domtar, Inc., Montreal, Canada

[21] Appl. No.: 602,419

[22] Filed: Oct. 22, 1990

[51] Int. Cl.[5] .......................... B32B 31/06; B32B 31/22

[52] U.S. Cl. ....................................... 156/45; 156/209; 156/347

[58] Field of Search ...................... 156/40, 44, 45, 209, 156/347; 425/115

[56] References Cited

U.S. PATENT DOCUMENTS

| | | | |
|---|---|---|---|
| 1,841,757 | 1/1932 | Munroe . | |
| 1,856,936 | 5/1932 | Turner . | |
| 1,871,563 | 8/1932 | Ericson | 156/347 |
| 2,006,528 | 7/1935 | Walper | 156/45 |
| 2,044,234 | 6/1936 | Walper . | |
| 2,090,084 | 8/1937 | Walper | 156/45 |
| 2,168,803 | 8/1939 | Page . | |
| 2,238,017 | 4/1941 | Duncan . | |
| 2,246,987 | 6/1941 | Roos . | |
| 2,523,861 | 9/1950 | Buttress | 156/45 |
| 2,537,509 | 1/1951 | Camp . | |
| 2,991,824 | 7/1961 | Loechl . | |
| 2,991,825 | 7/1961 | Hampson . | |
| 2,991,826 | 7/1961 | Armstrong . | |
| 3,050,104 | 8/1962 | Burt . | |
| 3,180,058 | 4/1965 | Tillisch et al. . | |
| 3,233,301 | 2/1966 | Tillisch et al. . | |
| 4,584,224 | 4/1986 | Schneller . | |

*Primary Examiner*—Michael W. Ball
*Assistant Examiner*—Steven D. Maki
*Attorney, Agent, or Firm*—Harness, Dickey & Pierce

[57] ABSTRACT

A method for making gypsum wall board in which during the production of the board pressure is applied to a portion or all of the board surface to reshape, compress and densify the gypsum core to change the shape or contour the face surface of the gypsum board. The pressure must be applied in a systematic fashion to avoid creating lateral shifting or shear stresses in the gypsum core or between the core and paper surface to avoid destroying the paper to gypsum core band. The method can be used to product a cross taper at the cut ends of the board, to produce a decoratively shaped board surface and to densify the entire board core for special gypsum board applications.

15 Claims, 3 Drawing Sheets

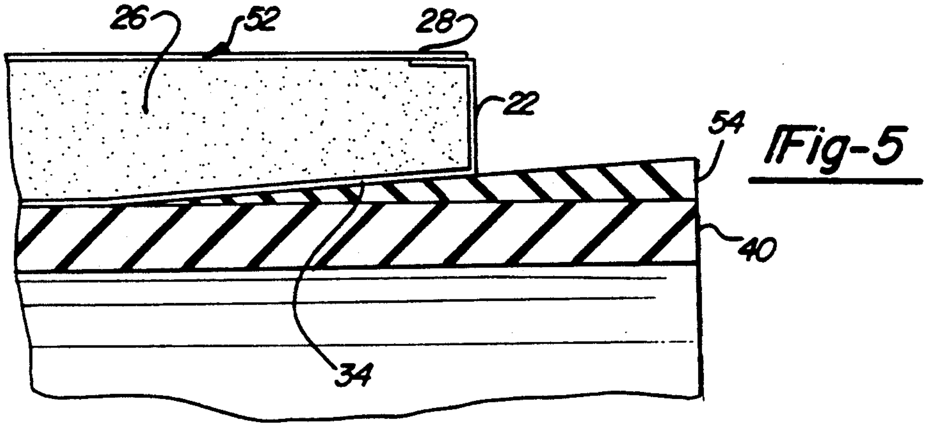
Fig-5
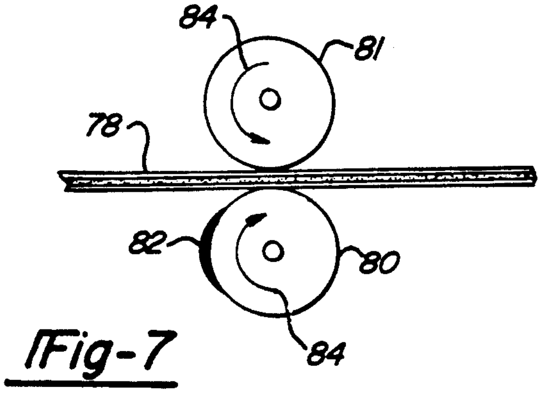
Fig-7
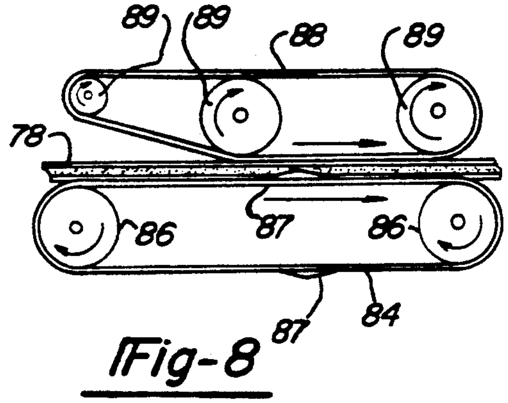
Fig-8
Fig-6
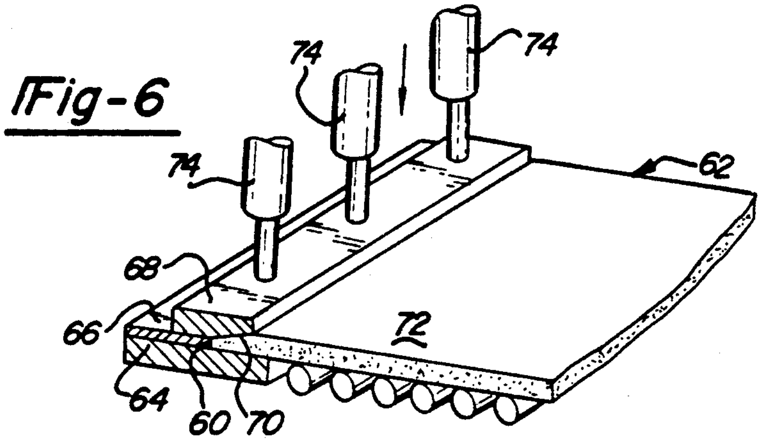

METHOD OF RESHAPING A GYPSUM BOARD CORE AND PRODUCTS MADE BY SAME

BACKGROUND AND SUMMARY OF THE INVENTION

The present invention relates to the manufacture of gypsum board and in particular to a method of systematically reshaping the gypsum core or a portion of the gypsum core to produce a gypsum board having improved appearance and/or properties. The reshaping process results in core densification and can be used for many applications including producing end or cross tapers at the cut ends of the board, producing decorative patterns or textures in the surface of the board and for densifying the entire board core for special gypsum board applications.

Gypsum board is a laminate structure comprising a core of gypsum sandwiched between a face paper on one side and a back paper on the other side. Gypsum board is manufactured by a relatively high speed continuous method wherein a slurry of calcined gypsum and various additives are mixed with more than sufficient water for hydration and setting of the gypsum. The slurry is deposited on a lower, continuously advancing paper sheet and an upper continuously advancing paper sheet is layed over the slurry. The laminate structure is then formed into a continuous flat sheet of paper enclosed gypsum.

In the typical process the gypsum board is made face side down. The face paper, on the bottom, is folded upward along the two longitudinal edges and folded over onto the top of the slurry along these edges. The back paper is placed on top of the slurry, overlapping the edge portion of the face paper that is folded over onto the back side of the board. The continuous sheet is carried on a conveyor belt and rollers for a considerable distance until the gypsum core has set to a sufficient degree to permit the board to be cut into normal board lengths and transferred to high temperature drying kilns.

The bond between the paper and the gypsum core is of critical importance to the quality of the gypsum board. A poor quality gypsum board bond will result in a bond failure evidenced by the paper readily peeling away from the core with little force and no evidence or very light dusting of the gypsum core particles sticking to the paper surface. Another bond failure occurs with the paper separating from the core with various amounts or thicknesses of the core fragments adhering to the paper. This type of failure is referred to as a "split".

It has been the general belief in the industry that if the bond is disturbed during the gypsum setting process that a defect would result. Such defects are manifested in what are referred to as paper "blows" during the kiln heating in which bubbles or blisters form between the paper and core or "peelers" in which the paper peels cleanly from the core after drying without adhering to any of the gypsum.

One example within the industry of the concern with disturbing the bond involves the printing wheel used to label the boards. A printing wheel is typically used to label the back paper of the board before the continuous board is cut. If the pressure applied by the printing wheel exceeds a maximum value, a bond failure results. As a result, the printing wheel is closely monitored to avoid excess and/or imbalanced pressure application to the board causing this type of bond failure. Accordingly, it has been believed in the industry that any disturbance of the bond by pressure application during formation of the board will result in a bond failure.

Production of specialty gypsum board having a face surface other than substantially flat, except for an edge taper as discussed below, was thought to be impossible if the process involved the application of pressure. It was believed that pressure application to the board would destroy the gypsum board bond. The production of a decorative gypsum board was therefore limited to board produced with a decorative pattern printed on the face paper or produced by pre-embossing the paper prior to formation of the gypsum board. Both of these methods have their own drawbacks. For example, the use of a paper having a decorative printing or finish thereon can adversely affect the ability of water vapor to pass through the paper during drying of the gypsum board. With pre-printed or pre-embossed paper, the decorative patterns that can be used are limited to random patterns such that the boards do not have identical patterns.

Accordingly, it is an object of the present invention to develop a method of manufacturing gypsum board with a contoured face surface shape by using pressure without adversely affecting the gypsum core to paper bond.

It is a further object of the invention to produce the contoured or shaped gypsum board in an on-line process without significant reduction in the production rate of the gypsum board.

It has been found that the surface of the gypsum board core can be reshaped or contoured by a process of systematic pressure application to the gypsum core. The pressure application results in densification of the gypsum core and can take place at any time in the production process as long as the pressure application is controlled to produce only compressive loading on the gypsum core and no lateral shifting of the core mass occurs. Any shear stress at the paper/core interface or shear stress within the core that results in lateral displacement of the paper or the gypsum crystals destroys the bond, resulting in a bond failure. With compressive loading only, it has been found that if the bond is weakened by the pressure application, the bond ultimately heals such that after drying, there is a quality gypsum board bond. If shear stresses are induced resulting in a shift of the paper and/or gypsum crystals, the bond is completely destroyed and cannot be healed.

The setting of the gypsum core is an exothermic reaction resulting in a rise in temperature in the core. As a result, by monitoring the temperature of the gypsum core, the progress of the gypsum setting can be monitored. To avoid a lateral shift in the gypsum mass caused by pressure application, the hydration cycle must progress to a minimum point before the pressure can be successfully applied. The hydration cycle must reach the point where the core has attained a sufficient degree of stiffness to allow compression without the gypsum mass moving laterally. After the gypsum has reached this point, the densification can occur at any point up to and after the gypsum has reached its maximum temperature rise.

The unexpected finding that the gypsum core can be densified by the application of compressive loading was the result of an experiment conducted at a gypsum board production plant. The gypsum board, while setting and traveling on the conveyor belt, was simultaneously densified in two different manners. In the first case, a ten pound heavy aluminum pin was placed on the surface of the board and pressure was applied to create a continuous dent in the board surface as the board passed beneath the rotating pin. In the other case, pressure was applied to the board to create a depression of the same depth but the board was not allowed to pass under the applied load. Instead, the person applying the load walked with the moving board while exerting pressure at a single location. After drying, blisters and bond failures were found where the board was allowed to pass underneath the roller which was creating a drag between the paper and the core. The depression created through compressive force alone displayed a perfect paper to core bond.

The pressure applied is controlled within a predetermined range depending in part on the point in the gypsum hydration cycle where the pressure is applied. The compressive loading reshapes the gypsum core by densifying the gypsum by displacing gypsum crystals into the air voids formed in the gypsum core as well as into the voids left by evaporated water during the hydration cycle.

An example of pressure application to a board surface is found in U.S. Pat. Nos. 3,180,058 and 3,233,301 to Tillisch et al. There, a knurled roller was pressed in the board on the face surface along the edges to produce shallow discontinuous indentations in the board surface. The indentations are limited to the surface only and have depths of no more than 0.012 of an inch. The shallowness of the indentations is highlighted when it is compared to the current paper thickness of 0.016 of an inch. At the time of the Tillisch inventions the paper was likely thicker than it is today. The method of the present invention goes beyond the surface indentations formed by Tillisch to form relatively deep depressions by densifying the core.

In order to determine the effect of the Tillisch process on the board bond, the specifications of the Tillisch patents were followed in an experiment to evaluate the board bond. In the Tillisch patents it is noted that the indentations "do not affect the strength of the board edge." The effect of the Tillisch process on the bond itself however, is not mentioned in the patents. It was found that the areas of the board pressed by the projections of the knurled pin resulted in board bond failures while the bond in surrounding areas that were not pressed did not fail. Since the pressed areas were only one eighth inch square, significant area without bond failures remained, perhaps leading Tillisch to believe that the board bond was not effected and that the process was satisfactory.

It is believed that as pressure is applied with the knurled pin, the core material near the core surface is pushed laterally in front of the pin. This shear loading disrupts the bond forming between the paper and core and also disrupts the gypsum crystal structure resulting in bond failure. This is the same effect observed from the printing wheel if the pressure applied by the wheel exceeds a certain value or becomes imbalanced to create a drag between the core and paper. This test result emphasizes the need for a process in which a compressive force is applied without any or at least without significant shear forces being applied to the board. A principal cause of the shear stress in Tillisch is believed to be the failure to independently drive the knurled pin as well as the support wheel at line speed rather than letting the moving board rotate the pin. With a drive, the contact between the pin or roller surface and board can be static such that shear forces are substantially eliminated.

The core reshaping process can be used to produce a number of specialty gypsum boards. One application is the formation of a cross taper at the cut ends of the gypsum board. The ends of the board have not previously been tapered in a commercially viable process. Other applications include densifying the entire board for specialty applications and for producing a decorative shape or contour to the face of the gypsum board. The process will be described below primarily in the context of forming a board with end tapers.

Typical interior building construction comprises a plurality of spaced framing members referred to as studs, furring or joists. One or more layers of gypsum board are secured to one or each side of the framing members forming the wall or ceiling surfaces. The side edges of the gypsum boards are generally butted together over a framing member and nailed or screwed thereto with the fasteners extending through the gypsum board and into the framing members. To construct a monolithic appearing wall, the butt joints between adjacent gypsum boards are concealed by covering the joint with a reinforcing joint tape and several layers of a joint compound to cover the joint, the joint tape and the fasteners. To construct a smooth surface without ridges formed by the joint tape and compound, the gypsum board is produced with a slight taper on the face surface adjacent the longitudinal or side edges of the board. The taper results in a slight depression in the wall or ceiling surface at the joints. The depression is filled with the joint compound producing a smooth finish at the joint without a raised ridge.

As described above, thr gypsum board is produced face down on a long conveyor as a continuous board that is later cut across its width into the desired length of board. It is common to produce a gypsum board with a taper at the longitudinal edges of the board parallel to the direction of board travel during manufacture. When the continuous board is produced, it is carried on a conveyor belt. Tapered edge belts are placed over the conveyor belt at the location of the two board edges so that the board is formed to the contour of the tapered edge belt. The tapering belts reduce the board thickness at the edges providing the depression for the joint tape and compound.

It is difficult however, to manufacture a gypsum board with a taper at the cut ends of the board, i.e., the ends of the board transverse to the direction of board travel during production. As a result, when the cut ends of the gypsum board are used to form a butt joint, there is no taper into which the fasteners, reinforcing joint tape and joint compound can be concealed. With a butt joint without tapers in the gypsum board, it is necessary to feather, or thin, the joint compound over a considerable width on both sides of the joint in an effort to conceal it. However, under certain lighting conditions this raised ridge at the joint can be detectable.

This problem could be overcome in six to twelve foot wall or ceiling sections by installing the gypsum board parallel to framing members. However, due to the orientation of the surfacing paper fibers it is more desirable to install the board at right angles to the framing for strength and sag resistance. Perpendicular application often creates the condition of abutting end joints. With an end taper however, abutting end joints can easily be made without forming a ridge of tape and joint compound.

Attempts have been made in the past to produce tapered areas across the width of a board at the desired length intervals during the board production by placing cross tapering belts or slats between the board and the main conveyor belt. This method presents several problems, however, which have prevented successful commercialization. One problem is material management, i.e. what to do with the gypsum displaced by the cross belt. The slurry is discharged onto the face paper at a constant rate. If the amount of material needed at a particular location is reduced by the cross belt, the excess material must have some place to go. Another problem is in synchronizing the tapers with the knife used to cut the continuous board into individual boards. Expansion of the board during the hydration of the gypsum slurry and slippage of the board over the conveyor belt have made it difficult to accurately synchronize the cross tapers with the knife cuts.

As a result, there has been no commercially viable method developed to form an end taper in a gypsum board with an on-line process. One attempt to produce an end taper off-line has been to physically remove a portion of the gypsum core by cutting into the board parallel to the board face with a saw blade. After a portion of the core has been removed by the saw blade, the thin layer of gypsum material remaining on the face paper is bent inward, closing the saw cut groove and resulting in a taper in the face surface of the board. Such a tapering operation, however, significantly reduces the strength of the board at the critical location where the board is fastened to the framing members. In addition, the method is time consuming and must be performed off-line, resulting in significant added cost.

Other methods have been proposed such as removing the face paper and a portion of the underlying gypsum core along the cut ends, providing a depression to fill with the joint compound. This method however, cannot be used with joint tape. The width of the removed face paper and core must be narrower than the width by which the gypsum board overlaps the framing members so that the fasteners can be placed in the face paper rather than in the area where the paper has been removed. The resulting width of the removed board portion is narrower than the reinforcing joint tape making use of joint tape impractical. If the paper is removed from an area wide enough to accommodate the joint tape, it will be too weak to withstand handling and the nail holding power will be substantially decreased.

There is a tapered end gypsum board available in the European market. The tapers are accomplished by again, removing a portion of the face paper at the board end and machining the taper in the gypsum core. With this board, joint tape is not used to finish the gypsum board. Instead, a specially formulated joint compound is filled in the depression. To use a joint tape, a wider portion of the paper would need to be removed which will pose the same problems with nail holding and strength as described above. This tapeless joint system is another example of the need and the attempts by the industry to try to create a taper at the board ends. The use of the core reshaping process of the present invention to produce an end taper in the board during on-line board production satisfies this need in the industry in a commercially viable manner.

Another advantage of end tapers produced by core densification is a reduced drying rate of the gypsum core at the cut ends. Air flowing over a board in the dryer has a tendency to dry the board faster at the periphery of the board. This is more pronounced at the cut ends than the finished edges due to impingement of the hot dryer air directly on the board ends. The result can be overdrying of the gypsum at the cut ends. By densifying the core at the cut ends, the rate of drying is reduced such that overdrying can be avoided.

Another advantage of tapered ends is that by now enabling end to end butt joints to be made smoothly, without a hump, the board can now be easily installed perpendicular to the wall framing members. This can shorten to total linear length of joints by using boards longer than eight feet and also positions the majority of the joint at the four foot level where it can be more easily finished. Perpendicular installation also reduces sagging of the board as discussed above.

Core reshaping can be accomplished at any point in the production cycle after the core has set sufficiently to provide enough stiffness to allow compression without the gypsum moving in the lateral direction. There are, however, preferred locations in the process that are better suited to accomplishing core reshaping. Reshaping the core early in the gypsum hydration cycle has advantage of lowering the force requirement. However, the memory retention capability of the core is lower in part due to the gravitational pull on the core. For end tapers or other contouring, the effect of gravity is of particular concern because the board is traveling face down and the contour or end taper is pressed upwardly into the board resulting in no support immediately below the contoured face surface. Reshaping the core later in the hydration cycle, i.e. closer to the knife, would reduce the effect of gravity but would increase the amount of force needed to densify the core. The preferred time for reshaping is at about 40 to 45 percent of the gypsum hydration cycle.

Later in the board production cycle the board is turned face up before it enters the dryer. After the board has been inverted and before it enters the dryer is another opportunity for core reshaping. At this stage, normally 90 percent or more of the hydration has occurred.

Besides the production of an end taper, another application of the reshaping process is the production of gypsum board having a contoured or patterned surface. Such gypsum board has been previously produced by an off-line pressing operation after the board has been dried. However, the process typically results in a "split" in the gypsum core. The process of this invention allows such a pattern to be pressed into the gypsum board by systematically densifying the core before the board enters the dryer without adversely affecting the board bond, thereby producing a high quality product.

Further objects, features and advantages of the invention will become apparent from a consideration of the following description and the appended claims when taken in connection with the accompanying drawings.

BRIEF DESCRIPTION OF THE DRAWINGS

FIG. 5 is a sectional view as seen from substantially the line 5—5 of FIG. 4 illustrating the production of the edge taper;

FIG. 6 is a perspective view of a press used to reshape and densify the core while the board is stationary;

FIGS. 7-9 are schematic views of moving presses used to reshape and densify portions of the continuous board before the board is cut to individual lengths.

DETAILED DESCRIPTION OF THE INVENTION

Figure 1:
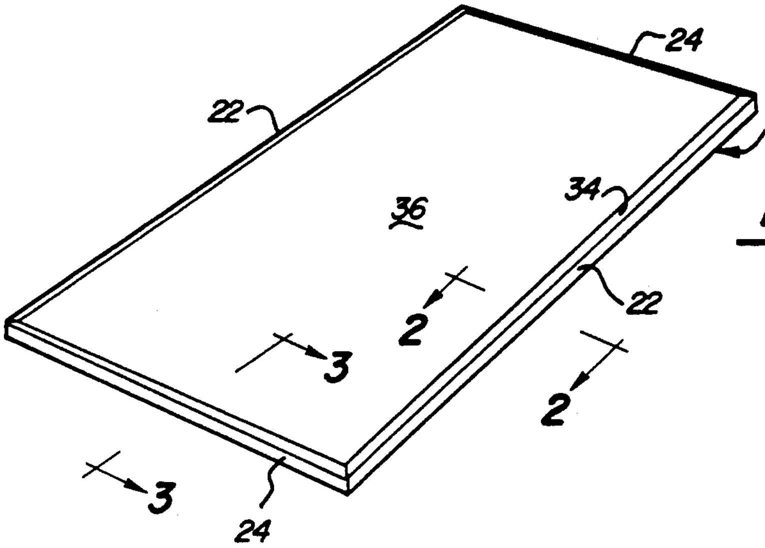
FIG. 1 is a perspective view of a gypsum board produced according to this invention having tapered ends as well as tapered edges.

The systematic core reshaping process of the present invention is described below as used to produce end tapers in gypsum board. Gypsum board 20, having ends tapered by reshaping and densifing the core according to the present invention in shown in FIG. 1. The edges 22 of board 20 extend parallel to the direction of travel of the board during manufacturing as will be described below. Board 20 has two cut ends 24 that extend transverse to the edges 22. As used herein, the term "edge" refers to the finished edge of the board extending parallel to the direction of board travel whereas the term "end" refers to the cut end of the board extending transverse to the edges.

Figure 2:
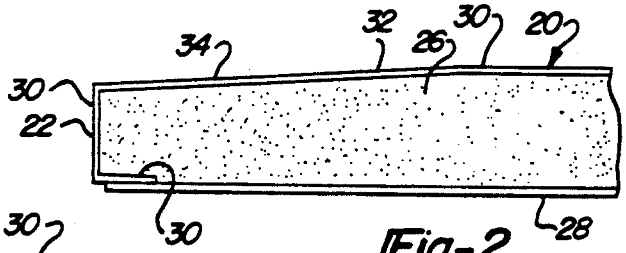
FIG. 2 is a sectional view of an edge taper as seen from substantially the line 2—2 of FIG. 1.

A cross section of an edge 22 is shown in FIG. 2. The board 20 is constructed of a core 26 of gypsum covered on one side by a back paper 28 and on the other side by a face paper 30. When used in building construction, the back paper 28 is mounted against the framing members leaving the face paper 30 exposed. The face paper 30 is folded over the edge 22 and onto the backside of the board where it is overlapped by the back paper 28. The face side 32 of the gypsum board 20 includes a taper 34 adjacent the edge 22. The taper 34 is formed by a gradual reduction of the board caliper from the center portion or field 36 of the board toward the edge 22. The taper 34 along the edges 22 is formed by well known methods as described below. Typically, the board thickness at the edge is 0.060-0.070 of an inch less than the thickness of the board field.

Figure 3:
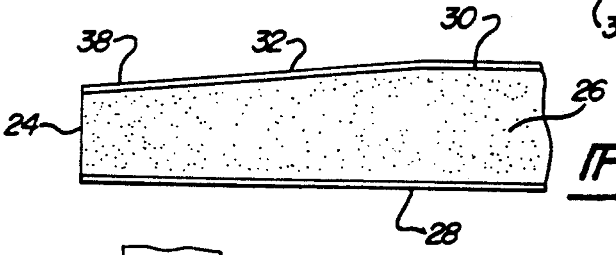
FIG. 3 is a sectional view of an end taper as seen from substantially the line 3—3 of FIG. 1.

FIG. 3 illustrates a cross section of a cut end 24 of board 20. The board 20 is formed from a continuous board that is later cut at predetermined locations to provide boards of the desired length. The cut ends 24, by the nature of the production method leave the gypsum core 26 exposed between the back paper 28 and face paper 30. The present invention provides a method of producing the taper 38 in the front side 32 of the board, along the cut ends 24, that is identical to the taper 34 along the edges. The taper 38, by reducing the caliper of the board at the cut end enables an end-to-end butt joint to be formed with a depression that is filled with the joint tape and compound to cover the fasteners and conceal the joint, producing a smooth finish.

Figure 4:
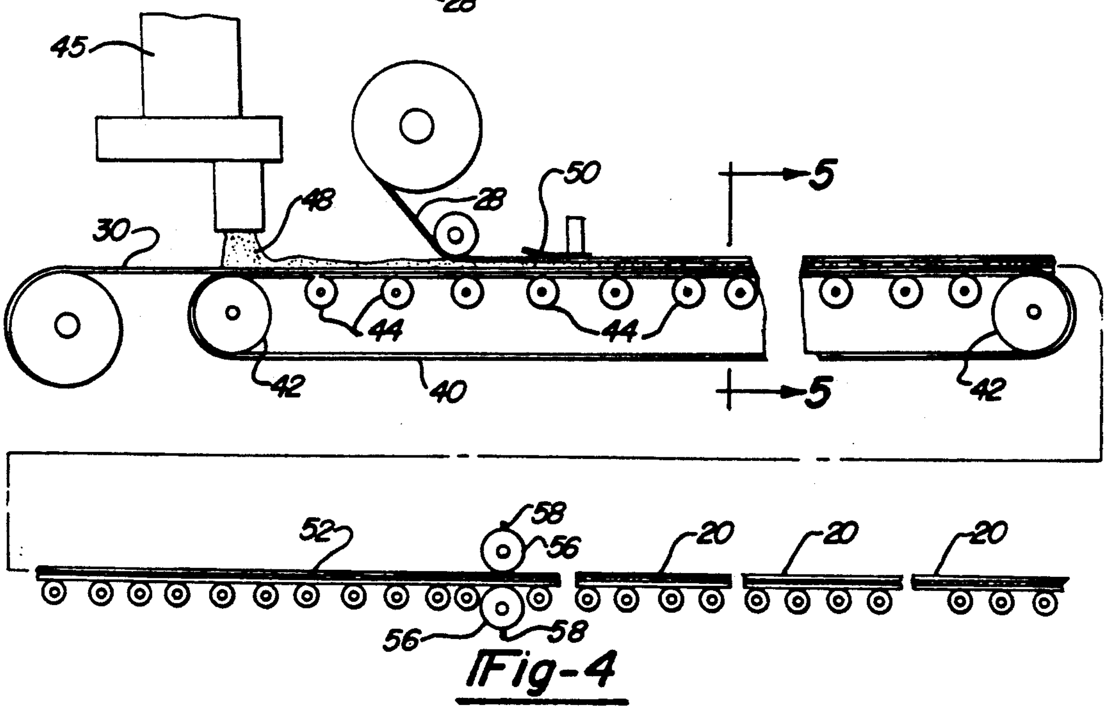
FIG. 4 is a schematic view of the production line for gypsum board.

Production of gypsum board is schematically shown in FIG. 4. The board is formed on a long conveyor comprising one or more endless belts 40 revolving around end rollers 42. A plurality of support rollers 44 support the endless belt 40 between the end rollers 42. The board is formed with the face side 32 of the board down. The face paper 30 is first placed on the belt 40 after which a mixer 46 deposits a slurry 48 of calcined gypsum, water and various additives onto the face paper 30. The slurry is then covered with the back paper 28. The paper and slurry passes beneath a forming plate 50 or a master roll that is vertically movable to adjust the thickness of the board being produced. The laminate structure is shaped to form a flat board having two parallel major surfaces. The face paper is folded to cover the gypsum core along the edges and folded onto the backside of the board where it is overlapped by the back paper.

As the board structure moves along the conveyor, the calcined gypsum reacts with the water in the slurry to form gypsum. The reaction is exothermic enabling the extent of hydration to be determined by the temperature of the gypsum core.

FIG. 5 shows a cross section of the edge portion of the continuous gypsum board 52 as it moves along conveyor belt 40. A tapered edge belt 54 is placed along the edge of the continuous belt 40 and extends beneath the continuous board 52 along edge 22, tapering in thickness toward the center of the gypsum board. This forms the taper 34 along the edge 22 by reducing the thickness of the gypsum board at the edge. The tapering belt is beneath the board as it passes the forming plate 50 to form the board with the taper. The tapering belt 54 continues along the edge of the conveyor until after the point where the slurry has sufficiently set to maintain its shape without the support of the tapering belt.

After a predetermined amount of time enabling the slurry mixture to reach a predetermined set, the continuous gypsum board passes a rotary cutter 56 having knives 58. The cutter rotates at predetermined intervals to cut the continuous board 52 into individual gypsum boards 20. The individual boards 20 are later fed through a kiln (not shown) in which the excess water is removed from the board 20. After drying and finish grinding of the cut ends, two boards are positioned face to face and taped together along their ends 24. This briefly describes a typical gypsum board production process and illustrates a conventional way of forming the taper 34 along the longitudinal edges 22 of the gypsum board.

FIG. 6 illustrates one method of forming an end taper in a gypsum board while the board is being held stationary. On some gypsum board production lines the board stops for a few seconds before entering the dryer. The cut end 60 of board 62 is placed over a support plate 64 and positioned against a stop plate 66. The thickness of stop plate 66 is the desired thickness to which the end of a board is to be tapered by the press plate 68 with allowance made for spring back after pressing. The lower surface of press plate 68 includes a tapered portion 70 that engages the face 72 of board 62 adjacent the end 60. A plurality of hydraulic cylinders 74 are used to press the plate 68 downward against the stop plate 66 and board 62. After the board is pressed, it is dried to remove excess moisture and the cut ends are trimmed to the exact length. The typical amount of material removed in the trim process as well as slight spring back in the thickness of the pressed board must be taken into account in determining the thickness of the stop plate 66 and the dimensions of press plate 68.

Figure 7A:
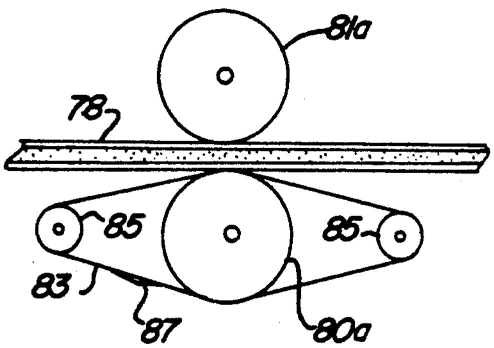

FIGS. 7, 7A, 8 and 9 disclose various embodiments of moving presses capable of pressing the taper into the moving continuous gypsum board. FIG. 7 shows a gypsum board 78 passing between two press rolls 80 and 81. The lower press roll 80 includes a press plate 82 which is pressed into the lower side of the board 78 to form the taper therein. The upper press roll 81 provides support to the board to resist upward deflection of the board caused by the press plate 82. Press roll 80 is rotated in an intermittent manner similar to the rotary knives used to cut the board so as to produce a taper at any desired location depending on the length of gypsum board being produced. The press rolls 80 and 81 are driven in the direction of arrows 84 such that the speed of the roll periphery is equal to the line speed of the board 78. It is important that the rolls be driven exactly at the board speed so as to avoid shear stress or lateral movement of the core. This will avoid the bond failures noted with the Tillisch apparatus that caused by the drag of the knurled pin on the board surface.

FIG. 7A is a modified form of the press shown in FIG. 7. A belt 83 has been added rotating about rollers 85. The belt includes a press plate 87 to form the taper in the board and moves at the speed of board 78. The press rolls 80a and 81a are used to press plate 87 into the board lower surface.

FIG. 8 shows a continuous belt press used to form the taper in the board 78. A lower belt 84 carried by rollers 86 includes one or more press plates 87 that are pressed up into the lower surface of board 87. A support belt 88 above the board 78 is carried by rollers 89. This press is similar to the Conti-Roll press by Siempelkamp of Germany.

Figure 9:
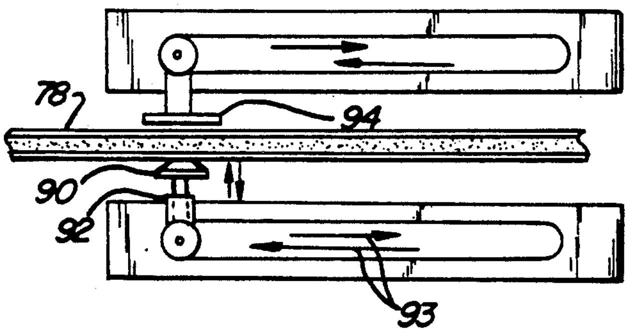

A third press shown in FIG. 9 oscillates back and forth to periodically press the taper into the board. The lower press plate 90 is carried by a cylinder 92 that intermittently raises the press plate 90 into the lower surface of board 78. The press plate 90 and cylinder 92 oscillate back and forth as shown by arrows 93. A support plate 94 oscillates back and forth along the upper surface of board 78. In operation, the cylinder 92 will press the press plate 90 into the board surface and travel along with the board at the board speed for a predetermined period of time afterwhich the press plate is retracted away from the board. The press plate and cylinder then return to the initial position to being the next pressing operation. It is essential that the press plate 90 be moving at the board speed prior to initiation of contact with the board surface to avoid shear stress or lateral shifting of the gypsum core.

Figure 10A:
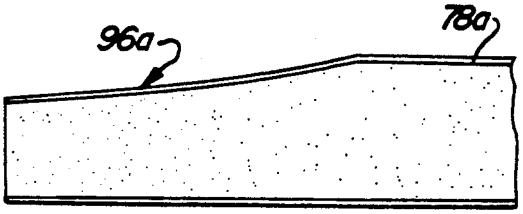
FIG. 10A-10C are sectional views of possible end taper profiles.
Figure 10B:
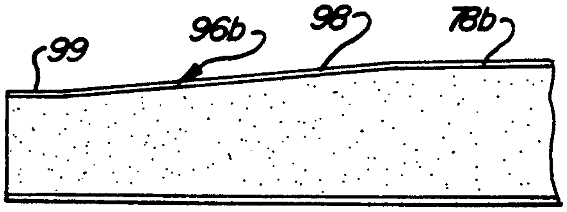
Figure 10C:
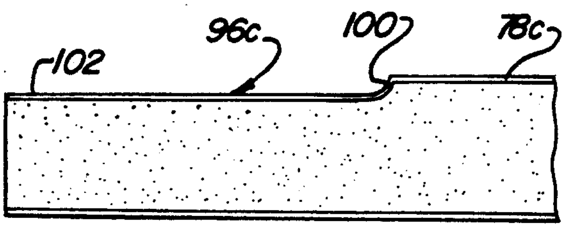

Various contours of taper can be pressed into the board other than that shown in FIG. 3. For example, FIGS. 10A-10C show three other taper shapes that can be produced. The board 78a has a generally curved taper 96a that would result from the curved press plate 82 on roll 80 shown in FIG. 7. Gypsum board 78d has a straight taper 96b with a incline portion 98 leading to a flat portion 99 substantially parallel with the field of the board. This taper may be pressed into a continuous board leaving a flat center portion between the tapers for cutting and finishing the board. The gypsum board 78c has a recessed taper 96c formed by a relatively sharp transition portion 100 leading to a flat portion 102 parallel to the board surfaces. These are only examples of possible taper contours and are not intended to be limiting.

Experiments have been conducted using one-half inch standard gypsum board to determine the amount of pressure that must be applied to the board surface to produce end tapers of a depth equal to or greater than the 0.062 inch edge taper. Pressure below 325 psi can be successfully used to produce the end tapers. One experiment used the press shown in FIG. 6 to press an end taper into production line boards at a point of 100% hydration. Pressures between 74 psi and 325 psi were used to produce tapers having depths of 0.050 to 0.095 inches and widths of between 1.88 inches to 2.81 inches. The taper contour was that shown in FIG. 3. A pressure of 103 psi was used to produce a taper depth of 0.079 inches over a width of 2.25 inches. This is the average pressure calculated by the total force applied to the press plate divided by the area of the plate. The actual pressure applied to the board surface will vary depending on the location of the particular area of interest due to the shape of the taper and the presence of a stop plate to resist the press plate. Differences in the composition of the gypsum slurry from one production plant to the next as well as the initial density of the gypsum core will have an affect on the pressure required to produce a given taper.

The taper width produced in the above experiments have been approximately 2.0-2.5 inches which is the desired width for current tape joint systems common in North America. Narrower taper widths, such as 0.25 inches can be formed with the method of the present invention if desired.

Another test was performed on laboratory produced gypsum board to determine the relationship between hydration and pressure required to form the taper. The gypsum board was pressed with a "V" shaped press plate to form a double taper simulating taper production prior to the board being cut. The press plate was pressed into the board to a depth of 0.125 inches at approximately 33, 50, 66 and 86 percent of hydration. The required pressures ranged from 55 to 150 psi. The taper depths after drying ranged from 0.065 to 0.096 inches. As expected, the required pressure increases with gypsum hydration. Other experiments have shown that gypsum board can be pressed at as low as 15% hydration without producing bond failure. These pressures are lower than the pressures reported by Tillisch. One explanation for the reduced pressure is that Tillisch, with multiple discontinuous indentations in the paper, required more deformation and stretch of the paper rather than compressing the gypsum core. As a result, higher pressures were required.

When the board is pressed to form end tapers prior to cutting the continuous board, it may be necessary to ensure that air in the gypsum core has an escape route. This is necessary because during densification, the air cells are crushed. If the paper is not sufficiently porous to allow the air to escape, it may be necessary to poke micro holes in the paper.

The maximum depth to which the wet gypsum board can be pressed is limited by the amount of air in the core that can be displaced and by the stretchability of the paper. The end taper as shown in FIG. 3 requires little paper stretch. However, patterns pressed into the board field may require significant paper stretch and will likely be limited by the paper.

The application of pressure to the gypsum board results in a systematic compression of the gypsum particles into the voids between the particles resulting in a gypsum core of increased density. The increase in density has been found to have no adverse affect or has improved several board characteristics.

Various performance criteria for gypsum, such as nail pull resistance and humidified bond strength are largely unaffected. The performance of end tapered boards remains within acceptable commercial and industry ranges.

The time required to dry the gypsum along the cut edges has also increased with densification. The increased core density has resulted in a slower drying of the gypsum core along the cut ends. This is beneficial in that the cut ends are often over dried due to the gypsum core being exposed at the ends. The overdrying of the ends can be reduced or avoided by densifying the core at the cut ends.

Another application is pressing of the entire board surface to increase the board density for special gypsum board applications. A further application of systematic core reshaping is the production of boards with various decorative contours and designs in the face paper. It is possible to press a decorative pattern into the board using a moving press as shown in FIG. 7, 8 and 9 or with a stationary press as illustrated in FIG. 6. In practicality it may be easier to use the stationary press. After pressing a pattern into the board 112, the cut ends of the board can be buffed to the desired length with the pattern placed in the board in a repeatable fashion from one board to the next. This is an advantage over the previous method of forming a contoured board by using pre-embossed face paper. With pre-embossed paper it is not possible to produce multiple identical boards in that the embossed pattern in the paper cannot be synchronized with the cutter to produce identical boards.

The core reshaping process of the present invention has been shown to be useful to produce a variety of board products having improved appearance and/or performance properties and is done so in a manner which does not detrimentally effect the gypsum board to paper bond. Furthermore, the process can be performed on-line with the manufacture of the board so as to not significantly add to the production cost of the board.

It is to be understood that the invention is not limited to the exact construction or method illustrated and described above, but that various changes and modifications may be made without departing from the spirit and scope of the invention as defined in the following claims.

I claim:

1. A method of producing a gypsum board comprising the steps of:

mixing a slurry comprising calcined gypsum and water in which, over time, said calcined gypsum hydrates;

forming a continuously advancing board of a face paper and a back paper bonded to a core of said slurry therebetween with said face paper being wrapped over the two longitudinal edges of said board, said board adjacent said longitudinal edges having a paper to decrease the thickness of said board at said longitudinal edges, said face and back papers being substantially parallel to one another between said tapers at said edges;

permitting said gypsum slurry to set sufficiently to provide enough stiffness to allow compression of said gypsum without lateral movement of said gypsum;

moving a press member spaced from said continuously advancing board at the same longitudinal speed as said continuously advancing board;

applying a compressive load to at least a portion of said face paper and said slurry of said continuously advancing board by pressing said press member into said face paper and slurry while said press member is moving at the same speed as said continuously advancing board to compress and densify the stiffened gypsum without generating such a force ion said gypsum or said face paper adequate to cause relative movement therebetween that would disturb the bond between said face paper and said gypsum to which said compressive load is applied, and thereafter;

cutting said continuously advancing board into individual boards of desired lengths each having cut ends transverse to said longitudinal edges.

2. The method of claim 1 wherein said pressure is applied when said gypsum is one hundred percent hydrated.

3. The method of claim 1 wherein said compressive load and gypsum densification produces a depression in said board of up to 0.150 inches.

4. The method of claim 1 wherein the entire board surface is compressively loaded to density the entire board core.

5. The method of claim 1 wherein said compressive load is applied to said face paper and said gypsum at a location adjacent to said cut ends wherein a depression in said gypsum caused by said load reduces the caliper of said individual boards at said cut ends by at least 0.015 inches.

6. The method of claim 5 further comprising the steps of heating said individual boards to remove excess water from said slurry and subsequently finish trimming said cut ends to produce a board of substantially the desired length and wherein the depression in said finished board reduces the caliper of said board at said finished cut ends by at least 0.015 inches.

7. The method of claim 5 wherein said continuously advancing board is subsequently cut at the center of the depression formed by the compressive load.

8. The method of claim 5 further comprising the steps of heating said individual boards to remove excess water from said slurry and subsequently finish trimming said cut ends to produce said individual boards of substantially the desired length wherein the compressive load produces a depressed taper int eh face surface of said individual boards having a width of between 0.25 and 3.0 inches and having a depth at the end of the individual boards of at least 0.015 inches.

9. A method of making a gypsum board having a gypsum core covered on one side by a face paper bonded to said core forming a face surface and covered on the opposite side with a back paper bonded to said core forming a back surface, said board further having two parallel longitudinal edges covered by paper and two parallel ends transverse to said edges at which said core is exposed between said face and back papers and the caliper of said board adjacent said ends and said edges being less than the remaining field of said board, said method comprising the steps of:

mixing a slurry comprised principally of calcined gypsum and water in which over time, said calcined gypsum hydrates;

depositing said slurry on a continuously advancing sheet of one of said face or back paper;

overlying said deposited slurry with a continuously advancing sheet of the other of said face or back paper;

forming said papers and slurry into a continuously advancing board of slurry covered by said papers with said longitudinal edges covered with paper, said board having a thickness between said face and back papers which tapers adjacent to said longitudinal edges to decrease the thickness of said board at said longitudinal edges, said face and back papers being substantially parallel to one another between said tapers at said longitudinal edges;

permitting said gypsum slurry to set sufficiently to provide enough stiffness to allow compression of said gypsum without lateral movement of said gypsum;

moving a press member spaced from said continuously advancing board at the same longitudinal speed as said continuously advancing board;

applying a compressive load to a portion of said face surface extending transversely of said board by pressing said press member into said face paper and said slurry while said press member is moving at the same speed as said continuously advancing board to compress and densify said slurry to reduce the caliper of said continuously advancing board at said pressed portion without generating a force on said gypsum or said face paper adequate to cause relative movement therebetween that would disturb the bond between said slurry and said face paper; and cutting said continuously advancing board into individual boards by cutting said advancing board transverse to said edges at said pressed portion to form said individual boards with reduced caliper at the ends thereof.

10. The method of claim 9 wherein said compressive load reduces the caliper of said individual boards at said cut ends by between 0.015–0.150 inches.

11. The method of claim 9 wherein said compressive load reduces the caliper of said individual boards at said cut ends by between 0.05 and 0.1 inches.

12. The method of claim 9 wherein the compressive load gradually reduces the caliper of said individual boards over an area adjacent said cut ends having a width of between 0.25 and 3.0 inches.

13. The method of claim 9 wherein the compressive load is between 50 and 500 psi.

14. The method of claim 9 wherein the compressive load is between 50 and 325 psi.

15. The method of claim 9 wherein the compressive load is between 50 and 150 psi.

* * * * *